United States Patent Office 3,513,174
Patented May 19, 1970

3,513,174
N,N' - ALKYLENE-BIS-DIBENZOBICYCLOOCTANO-PYRROLIDINE COMPOUNDS AND PRODUCTION THEREOF
Keizo Kitahonoki, Ikoma-gun, Nara Prefecture, and Ryonosuke Kido, Toyonaka-shi, Japan, assignors to Shionogi & Co., Ltd., Osaka, Japan
No Drawing. Filed Nov. 14, 1967, Ser. No. 682,975
Int. Cl. C07d 27/30
U.S. Cl. 260—326.1                     6 Claims

ABSTRACT OF THE DISCLOSURE

A dibenzobicyclo(2,2,2)octane-2,3-dicarboxylic anhydride is reacted with alkylenediamine containing from two to six carbon atoms to give an N,N'-alkylene-bis[dibenzobicyclo(2,2,2)octane-2,3-dicarboimide] compound, and the resultant product is reduced with metallic hydride complex to give an N,N'-alkylene-bis[dibenzobicyclo(2,2,2)octanopyrrolidine] compound which is useful as musculotropic antispasmodics.

---

The present invention relates to N,N'-alkylene-bis-dibenzobicyclooctanopyrrolidine compounds and production thereof. More particularly, it relates to N,N'-alkylene-bis[dibenzobicyclo(2,2,2)octanopyrrolidine] compounds, the alkylene group being straight or branched and containing from two to six carbon atoms, and production thereof.

It is an object of the present invention to embody N,N'-alkylene - bis[dibenzobicyclo(2,2,2)octanopyrrolidine] compounds, the alkylene group being straight or branched and containing from two to six carbon atoms. Another object of this invention is to embody N,N'-alkylene-bis[dibenzobicyclo(2,2,2)octanopyrrolidine] compounds, the alkylene group being straight or branched and containing from two to six carbon atoms, useful as musculotropic antispasmodics. A further object of the invention is to embody a process for preparing N,N'-alkylene-bis[dibenzobicyclo(2,2,2)octanopyrrolidine] compounds, the alkylene group being straight or branched and containing from two to six carbon atoms. These and other objects will be apparent to those conversant with the art to which the present invention pertains from the subsequent description.

The said N,N'-alkylene-bis[dibenzobicyclo(2,2,2)octanopyrrolidine] compound (hereinafter referred to as "pyrrolidine compound") is represented by the formula:

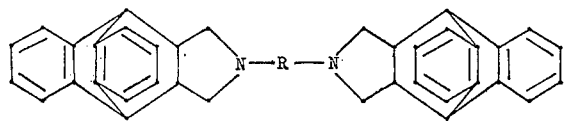

I wherein R represents a straight or branched alkylene group containing from two to six carbon atoms (e.g. ethylene, trimethylene, tetramethylene, hexamethylene, dimethylmethylene, 1-methylethylene, 2,2-dimethylpropylene, 1,3-dimethylbutylene).

According to the present invention, the pyrrolidine compound (I) is prepared by reacting dibenzobicyclo-(2,2,2)octane-2,3-dicarboxylic anhydride (hereinafter referred to as "dicarboxylic anhydride") represented by the formula:

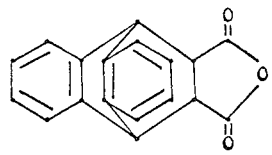

II with an alkylenediamine containing from two to six carbon atoms in an inert solvent (e.g. ether, dioxane, tetrahydrofuran) at room temperature or while heating at 60 to 130° C. and reducing the resulting N,N'-alkylene-bis-[dibenzobicyclo(2,2,2)octane-2,3-dicarboimide] (hereinafter referred to as "dicarboimide") represented by the formula:

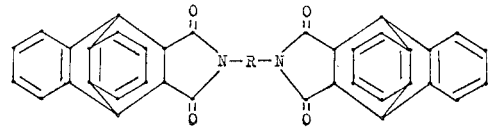

III wherein R has the same significance as designated above with metallic hydride complex (e.g. lithium aluminum hydride, sodium aluminum hydride, potassium aluminum hydride) in an inert solvent (e.g. ether, dioxane, tetrahydrofuran, diglyme) at room temperature or while heating at 30 to 150° C.

The said starting dicarboxylic anhydride (II) can be prepared by reacting anthracene with maleic anhydride according to Diels-Alder reaction.

The thus prepared pyrrolidine compound (I) may be, when required, converted into such the acid-addition salts suitable for the purpose of medical use as of low toxicity and desirable stability. The conversion can be effected by a conventional procedure, e.g. treatment of the pyrrolidine compound (I) with an acid in an appropriate solvent. Examples of the pharmaceutically acceptable acid-addition salts are hydrochloride, hydrobromide, hydroiodide, sulfate, nitrate, phosphate, oxalate, succinate, tartrate, malate, citrate, benzoate, salicylate and naphthalenedisulfonate.

The thus obtained pyrrolidine compound (I) and its pharmaceutically acceptable acid-addition salts are useful as musculotropic antispasmodics.

For instance, the antispasmodic activity and the acute toxicity of some pyrrolidine compounds (I) according to the present invention in comparison with papaverine hydrochloride (i.e. 6,7-dimethoxy - 1 - veratroylisoquinoline hydrochloride), a known musculotropic antispasmodic agent, are shown in the following Table I.

TABLE I

| Compound | Effect on inhibition | | | LD$_{50}$ (mg./kg.) |
|---|---|---|---|---|
| | Conc., gram/ml. | Judgement | Duration (min.) | |
| N,N'-ethylene-bis[dibenzobicyclo(2,2,2)octanopyrrolidine]dihydrochloride | 10$^{-6}$<br>5×10$^{-6}$<br>10$^{-5}$ | Inhibition(moderate)<br>Inhibition(remarked)<br>....do.... | 60<br>90<br>>120 | >1,000.0 |
| N,N'-trimethylene-bis[dibenzobicyclo(2,2,2)octanopyrrolidine]dihydrochloride | 10$^{-6}$<br>5×10$^{-6}$<br>10$^{-5}$ | Inhitibion(slight)<br>Inhibition(moderate)<br>Inhibition(remarked) | 60<br>90<br>>150 | 750.0 |
| N,N'-tetramethylene-bis[dibenzobicyclo(2,2,2)octanopyrrolidine]dihydrochloride | 10$^{-6}$<br>5×10$^{-6}$<br>10$^{-5}$ | Inhibition(remarked)<br>....do....<br>....do.... | 60<br>90<br>120 | 630.0 |
| N,N'-hexamethylene-bis[dibenzobicyclo(2,2,2)octanopyrrolidine]dihydrochloride | 5×10$^{-6}$<br>10$^{-5}$ | Inhibition(remarked)<br>....do.... | 70<br>90 | 710.0 |
| N,N'-(1-methylethylene)-bis[dibenzobicyclo(2,2,2)octanopyrrolidine]dihydrochloride | 10$^{-6}$<br>5×10$^{-5}$<br>10$^{-5}$ | Inhibition(moderate)<br>Inhibition(remarked)<br>....do.... | 60<br>90<br>120 | 650.0 |
| Papaverine hydrochloride | 10$^{-5}$<br>2×10$^{-5}$ | Inhibition(slight)<br>Inhibition(moderate) | 5<br>15 | 329.0 |

Note:
(1) Anti-spasmodic assay was carried out by Magnus method [Kobayashi, Y: Yakurigaku Jisshu Kogi, p. 84–92 (1957), Nankodo, Tokyo]. The isolated guinea-pig ileum was suspended into oxygenated Tyrod solution at 30° C. The contraction caused by barium chloride solution (5×10$^{-4}$ gram/ml.) was recorded on a kymograph with an isotonic lever, which provided eightfold magnification. After administration of a test compound, antispasmodic activity was expressed as the effect on inhibition of contraction in comparison with the control curve of a spasmogen only.
(2) Acute toxicity assay was carried out as follows: As test animals, there were used groups of white albino mice weighing from 15 to 17 grams, each group consisting of 20 mice. Each group of animals was subcutaneously treated with a certain amount of the test compound and observed for 24 hours after the treatment. The lethal dose 50 LD 50) was calculated by graphic interpolation from two doses actually used, one of which killed less than half and the other more than half the number of mice treated (Schleicher and Schull probability graph paper 298½ was used for the graphic interpolation).

Accordingly, the pyrrolidine compounds (I) exhibit much higher antispasmodic activity with longer duration and lower toxicity than papaverine hydrochloride.

The pyrrolidine compound (I) and its pharmaceutically acceptable acid-addition salts may be administered alone or in combination with acceptable pharmaceutical carriers, the choice of which is determined by the preferred route of administration, the solubility of the substance and standard pharmaceutical practice. Examples of pharmaceutical preparations are tablets, capsules, pills, suspension and solutions. In the preparation of tablets, for example, these substances may be combined with binders such as gum tragacanth, acacia, corn starch, gelatin, etc. It is also usually desirable to have present a disintegrating agent such as, for example, corn starch, potato starch, alginic acid or the like. Also desirable usually is a lubricant such as stearic acid, magnesium stearate or talc along with sweeting agents such as saccharin. Flavoring agents may be also used such as peppermint, oil of wintergreen or cherry flavor. In the preparation of capsules, fillers such as enumerated above for tablets can also be used. The compositions when used in the form of suspensions or solutions may be combined with aqueous sugar or sorbitol type vehicle including a viscosity control agent such as magnesium aluminum silicate, methylcellulose or carboxymethylcellulose and a suitable preservative such as sodium benzoate or p-hydroxybenzoic acid salts. In these liquid preparations, colorings, flavorings and buffers can also be included to produce a more pharmaceutically elegant preparation.

The compositions containing the pyrrolidine compound (I) or its pharmaceutically acceptable acid-addition salt may be dispensed in dosage unit forms for a single daily therapeutic dose or in smaller units for multiple doses or in larger units for division into single doses. Parenteral compositions can also be dispensed in single units or in larger quantities from which single doses are withdrawn at the time of use. In general, the dosage of these substances is of approximately the same order of magnitude as the dosages of papaverine hydrochloride, and these substances are useful to treat the types of smooth muscle spasmodic conditions often treated with the said known anti-spasmodic agent.

Presently-preferred and practical embodiments of the present invention are illustratively shown by the following examples. In these examples, the relationship of parts by weight to parts by volume is the same as that between grams and millilitres. Temperatures are set forth in degrees centigrade.

EXAMPLE 1

(a) To a solution of dibenzobicyclo(2,2,2)octane-2,3-dicarboxylic anhydride (14.05 parts by weight) in dioxane (100 parts by volume), there is added a solution of N,N'-ethylenediamine (1.47 parts by weight) in dioxane (40 parts by volume), and the resultant mixture is refluxed for 7 hours. After cooling, the precipitated crystals are collected by filtration and recrystallized from dioxane to give N,N'-ethylene-bis[dibenzobicyclo(2,2,2)octane - 2,3-dicarboimide] (11.38 parts by weight) as white powdery crystals melting at more than 350° C..

(b) To a suspension of N,N'-ethylene-bis[dibenzobicyclo(2,2,2)octane - 2,3 - dicarboimide] (3.00 parts by weight) in dioxane (140 parts by volume), there is added a suspension of lithium aluminum hydride (1.25 parts by weight) in dioxane (60 parts by volume), and the resultant mixture is refluxed for 7 hours. After cooling, the reaction mixture is mixed with water to decompose an excess of lithium aluminum hydride and filtered. The residue after filtration is washed with ether (200 parts by volume) and dioxane (300 parts by volume). The washings and the filtrate are combined, dried over anhydrous potassium carbonate and evaporated. The residue is recrystallized from chloroform to give N,N'-ethylene-bis[dibenzobicyclo(2,2,2)octanopyrrolidine] (1.47 parts by weight) as colorless needles melting at 224 to 226° C. The dihydrochloride is colorless plates melting at 297.5 to 302° C. (decomp.).

EXAMPLE 2

(a) To a solution of dibenzobicyclo(2,2,2)octane-2,3-dicarboxylic anhydride (10.85 parts by weight) in dioxane (90 parts by volume), there is added N,N'-trimethylenediamine (1.55 parts by weight), and the resultant mixture is refluxed for 5 hours. After cooling, the precipitated crystals are collected by filtration and recrystallized from dioxane to give N,N'-trimethylene-bis[dibenzobicyclo-(2,2,2)octane-2,3dicarboimide] (9.96 parts by weight) as crystals melting at 327 to 328° C.

(b) To a suspension of N,N'-trimethylene-bis[dibenzobicyclo(2,2,2)octane - 2,3 - dicarboimide] (2.62 parts by weight) in dioxane (130 parts by volume), there is added a suspension of lithium aluminum hydride (0.90 part by weight) in dioxane (50 parts by volume), and the resultant mixture is refluxed for 6 hours while stirring. After ice cooling, the reaction mixture is mixed with water to decompose an excess of lithium aluminum hydride and filtered. The residue after filtration is washed with ether. The washings and the filtrate are combined, dried over anhydrous potassium carbonate and evaporated to give crude crystals (2.63 parts by weight). The crude crystals are recrystallized from ethyl acetate to give N,N'-trimethylene - bis[dibenzobicyclo(2,2,2)octanopyrrolidine] (1.72 parts by weight) as columnar crystals melting at 159 to 162° C. The dihydrochloride is crystals melting at 207.5 to 210° C. (decomp.).

EXAMPLE 3

(a) To a solution of dibenzobicyclo(2,2,2)octane-2,3-dicarboxylic anhydride (7.00 parts by weight) in dioxane (70 parts by volume), there is added hexamethylenediamine (3.45 parts by weight), and the resultant mixture is refluxed for 5 hours. The reaction mixture is evaporated under reduced pressure. The precipitated crystals are recrystallized from dioxane to give N,N'-hexamethylene-bis[dibenzobicyclo(2,2,2)octane - 2,3 - dicarboimide] 5.96 parts by weight) as colorless crystals melting at 284 to 285° C.

(b) To a suspension of N,N'-hexamethylene-bis[dibenzobicyclo(2,2,2)octane-2,3-dicarboimide] (5.56 parts by weight) in dioxane (150 parts by volume), there is added a suspension of lithium aluminum hydride (1.34 parts by weight) in dioxane (50 parts by volume) with stirring, and the resultant mixture is refluxed for 5 hours. The reaction mixture is mixed with water with ice cooling to decompose an excess of lithium aluminum hydride and filtered. The residue after filtration is washed with chloroform. The washings and the filtrate are combined, dried over anhydrous potassium carbonate and evaporated. The precipitated crystals are recrystallized from ethyl acetate to N,N'-hexamethylene-bis[dibenzobicyclo(2,2,2)octanopyrrolidine] (5.50 parts by weight) as colorless needles melting at 137 to 139° C. The dihydrochloride is colorless columns melting at 252 to 253° C. (decomp.).

EXAMPLE 4

(a) To a solution of dibenzobicyclo(2,2,2)octane-2,3-dicarboxylic anhydride (7.00 parts by weight) in dioxane (60 parts by volume), there is added a solution of 1,2-diamino-propane (0.951 parts by weight) in dioxane (20 parts by volume), and the resultant mixture is refluxed for 6 hours. The reaction mixture is evaporated under reduced pressure and the residue is crystallized from ethyl acetate. The precipitated crystals are recrystallized from dioxane to give N,N'-(1-methylethylene)-bis[dibenzobicyclo(2,2,2)octane-2,3-dicarboimide] (4.90 parts by weight) as colorless prisms melting at 305 to 310° C.

(b) To a suspension of N,N'-(1-methylethylene)-bis-[dibenzobicyclo(2,2,2)octane - 2,3 - dicarboimide] (3.745 parts by weight) in dioxane (80 parts by volume), there is added a suspension of lithium aluminum hydride (0.96 part by weight) in dioxane (30 parts by volume), and the resultant mixture is refluxed for 6 hours. The reaction mixture is mixed with water with ice cooling to decompose an excess of lithium aluminum hydride and filtered. The residue after filtration is washed with ethyl acetate. The washings and the filtrate are combined, dried over anhydrous potassium carbonate and evaporated under reduced pressure. The residue is recrystallized from benzene ethyl acetate to give N,N'-(1-methylethylene)-bis[dibenzobicyclo(2,2,2)octanopyrrolidine] (3.249 parts by weight) as colorless crystals melting at 191 to 194° C. The hydrochloride is light yellow powdery crystals.

EXAMPLE 5

(a) To a solution of dibenzobicyclo(2,2,2)octane-2,3-dicarboxylic anhydride (7.002 parts by weight) in dioxane (70 parts by volume), there is added tetramethylenediamine (1.125 parts by weight), and the resultant mixture is refluxed for 6 hours. After cooling, the precipitated crystals are collected by filtration and recrystallized from dioxane to give N,N'-tetramethylene-bis[dibenzobicyclo-(2,2,2)octane-2,3-dicarboimide] (6.93 parts by weight) as colorless prisms melting at 340 to 341° C.

(b) To a suspension of N,N'-tetramethylene-bis[dibenzobicyclo(2,2,2)octane-2,3-dicarboimide] (6.823 parts by weight) in dioxane (100 parts by volume), there is added a suspension of lithium aluminum hydride (1.170 parts by weight) in dioxane (40 parts by volume), and the resultant mixture is refluxed for 7 hours. The reaction mixture is mixed with water with ice cooling to decompose an excess of lithium aluminum hydride and filtered. The residue after filtration is washed with tetrahydrofuran. The washings and the filtrate are combined, dried over anhydrous potassium carbonate and evaporated under reduced pressure. The residue is recrystallized from methanol chloroform to give N,N'-tetramethylene-bis-[dibenzobicyclo(2,2,2)octanopyrrolidine] (6.10 parts by weight) as colorless crystals melting at 258 to 259° C. The dihydrochloride is hygroscopic prisms melting at 281° C. (decomp.).

EXAMPLE 6

N,N'-ethylene - bis[dibenzobicyclo(2,2,2)octanopyrrolidine]dihydrochloride (2.50 kilograms), lactose (7.47 kilograms), cornstarch (3.48 kilograms) and magnesium stearate (2.10 kilograms) are mixed together and slugged. The slugs are crushed and passed through a 30 mesh screen. The resulting granules are mixed with magnesium stearate (2.45 kilograms) and tableted in the usual way to give 100,000 tablets. Each tablet weighing 180 milligrams contains 25.0 milligrams of the active ingredient.

EXAMPLE 7

N,N' - hexamethylene - bis[dibenzobicyclo(2,2,2)octanopyrrolidine]dihydrochloride (10.00 kilograms) and lactose (20.00 kilograms) are mixed, granulated with 10% acacia solution and dried. The granulate is forced through a 16 mesh screen and, thereafter, mixed with sodium lauryl sulfate (0.20 kilogram), magnesium stearate (1.00 kilogram) and potato starch (8.80 kilograms). The resultant mixture is tableted in the usual way to give 100,000 tablets. Each tablet weighing 40 milligrams contains 20.0 milligrams of the active ingredient.

EXAMPLE 8

N,N' - trimethylene - bis[dibenzobicyclo(2,2,2)octanopyrrolidine] dihydrochloride (125 grams) is dissolved in physiological saline solution to make 10 litres and filtered. The resultant solution is filled into 5,000 ampoules under nitrogen atmosphere and the ampoules are sterilized at 115° C. for 30 minutes. Each ampoule (2 millilitres) contains 25.0 milligrams of the active ingredient.

What is claimed is:

1. A member selected from the group consisting of a compound of the formula:

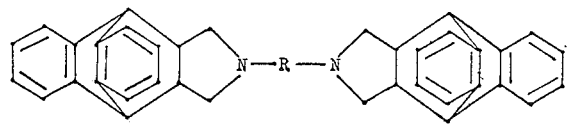

wherein R represents a straight or branched alkylene group containing from two to six carbon atoms, and its pharmaceutically acceptable acid-addition salts.

2. A compound according to claim 1, wherein the alkylene group is ethylene.

3. A compound according to claim 1, wherein the alkylene group is trimethylene.

4. A compound according to claim 1, wherein the alkylene group is tetramethylene.

5. A compound according to claim 1, wherein the alkylene group is hexamethylene.

6. A compound according to claim 1, wherein the alkylene group is 1-methylethylene.

References Cited

UNITED STATES PATENTS

| | | | |
|---|---|---|---|
| 3,123,618 | 3/1964 | Schumann et al. | 260—326.1 |
| 3,126,395 | 3/1964 | Kitahonoki et al. | 260—326.1 XR |
| 3,268,554 | 8/1966 | Bolger | 260—326.1 |

ALEX MAZEL, Primary Examiner

J. A. NARCAVAGE, Assistant Examiner

U.S. Cl. X.R.

424—274